March 25, 1969   E. RIETSCH   3,435,182
WELDING METHOD
Filed Aug. 18, 1966
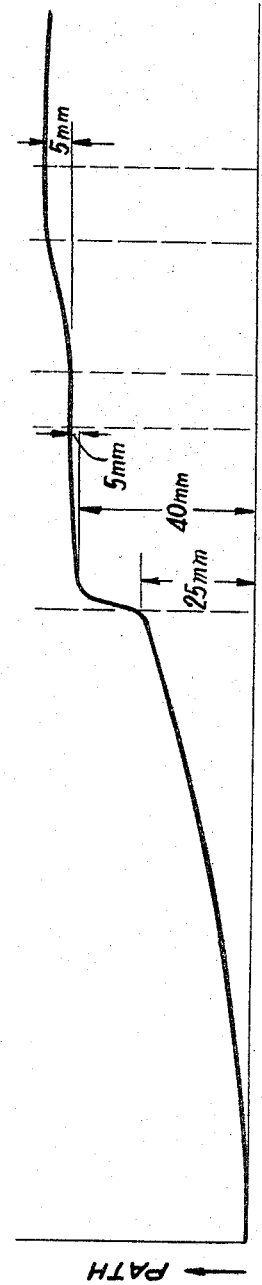
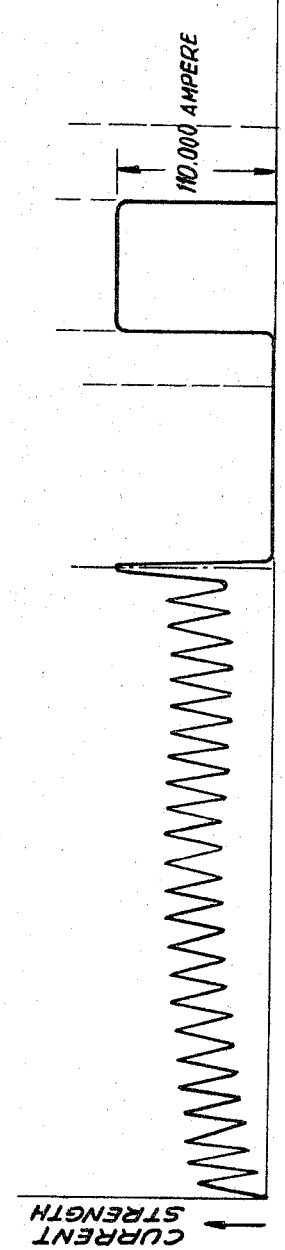
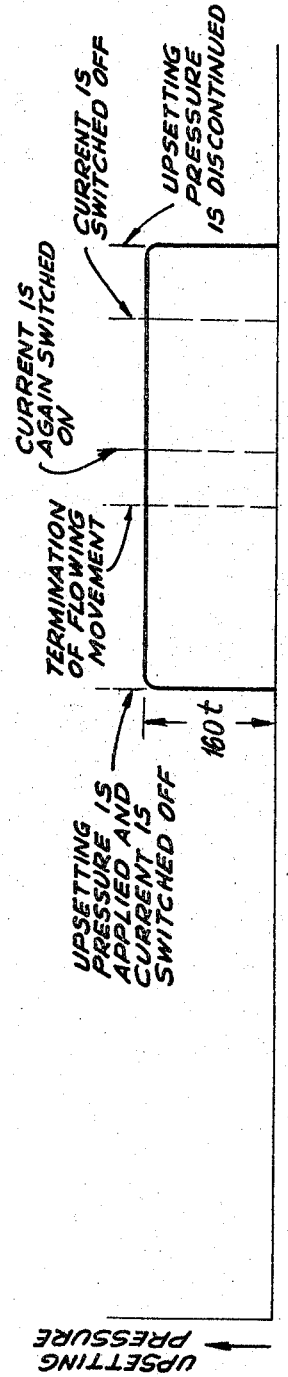
INVENTOR.
EBERHARD RIETSCH
BY
ATTORNEYS.

United States Patent Office 3,435,182
Patented Mar. 25, 1969

3,435,182
WELDING METHOD
Eberhard Rietsch, Burscheid, Germany, assignor to
Theodor Wuppermann Gesellschaft mit beschrankter
Haftung, Leverkusen, Germany
Filed Aug. 18, 1966, Ser. No. 573,259
Claims priority, application Germany, Aug. 19, 1965,
W 39,765
Int. Cl. B23k 11/04
U.S. Cl. 219—100      8 Claims This invention generally relates to welding and is particularly directed to a method for improving the structure of the welding seam or joint obtained by electrically flash butt welding workpieces in a welding machine.

In recent times, electrical resistance butt welding of workpieces of larger cross section is, almost without exception, performed according to the flash method. Although the joints or connections obtained in this manner generally are satisfactory and meet the requirements of most specifications, it is well known that the welding seam or joint exhibits an unsatisfactory microstructure. It is thus well established that the microstructure of welding seams obtained in the indicated manner is of granular configuration including large-sized grains and stalk-like crystals which are undesired for many purposes and weaken the welds.

Various proposals have been made to overcome this disadvantage. It has thus been suggested to subject the welding joint to a heat treatment after the welding proper. These subsequent heat treatments are usually performed at the welded workpiece in a furnace which permits for essentially exact control of the temperature and of the heating and cooling speed. However, experience has demonstrated that a single heat treatment or annealing of the workpiece is normally not sufficient completely to transform the undesired microstructure of the weld into a desired pattern, to wit, completely to dissolve the so-called Widmannstätten structure and to convert it into a fine grained structure. Since heat treatments in furnaces are relatively expensive and require considerable investment, attempts have been made to overcome the indicated drawback in a different manner. Further, the furnace heat treatments are not only very costly but, due to the annealing, the workpiece may become distorted as to shape.

For this reason, it has more recently been suggested to perform the heat treatment in the welding machine proper in which the welding has been carried out. According to these prior art proposals, the workpiece, after completed welding and after partial cooling down, is again heated by switching in the electrical current of the welding machine, the heating of the workpiece being performed until a temperature above the transformation point of the welding seam has been reached, to wit, the temperature at which the welding seam or area again softens. It will be readily appreciated that according to the very nature of this prior art method, it is impossible exactly to control and measure the temperature of heated workpiece, particularly if the workpiece is of large size. The success of such after heating or annealing in the welding machine is therefore a matter of luck and cannot exactly be predicted.

Accordingly, it is a primary object of this invention to overcome the disadvantages of the prior art methods and to provide a procedure for improving the microstructure of welding seams obtained by electrical flash butt welding of workpieces in a simple and superior manner.

Generally, it is an object of this invention to improve on the art of welding as presently practiced.

Briefly, the invention proposes a method by means of which the temperature of the heated zone of a welded piece is indirectly measured in most precise and accurate manner.

The inventive method is based on the realization that the plastic deformability or forming property of a metal is dependent on the temperature and the applied pressure. This thought may be expressed differently by stating that a body subjected to a predetermined pressure upon heating starts to "flow" in a plastic manner at a predetermined temperature and at a predetermined pressure.

In the light of this basic concept, the invention provides for a method of improving the welding seam or joint structure of workpieces which have been electrically flash butt welded, wherein the welding seam, after the welding, is subjected to an upsetting pressure of a magnitude sufficient to cause plastic deformation or flowing of the welding seam at a temperature which is about equal to the temperature corresponding to the transformation point of the welded area. While the welding seam is under this upsetting pressure, the welded area is heated to a temperature above the transformation point temperature, whereby the welding seam continues to flow until it has cooled down to a temperature approximating the transformation point. Accordingly, the welding area, after completed welding is subjected to such an upsetting pressure that the welded area continues to be plastically deformed or to flow while the workpiece which preferably is still in the machine and still hot, cools down until the transformation point has been reached. According to a particularly advantageous embodiment of the invention, the flowing, which thus ceases when the transformation point has been reached by cooling of the workpiece, is again initiated by again increasing the workpiece temperature while constantly maintaining the upsetting pressure referred to. If the workpiece is still in the machine, the renewed increase of the temperature is, of course, easily accomplished by again switching in the electric current of the machine.

The renewed increase of the workpiece temperature may be performed in several sequences, again advantageously by switching on and switching off the machine current.

It will be readily appreciated that the periodic initiation of the flowing at the welding area may be repeated for any number of times until the desired result has been obtained, to wit, until a desired dimension of the workpieces to be connected with each other has been reached and/or the microstructure of the welding seam has been altered and improved to the desired extent.

The inventive method may be carried out as follows:
After termination of the flash butt welding, which is carried out in the customary manner on a machine, the welding area is subjected to an exactly measured upset pressure which pressure corresponds to an initiation of the "flowing" at a temperature which is slightly above the temperature of the transformation point ($A_{c3}$). This pressure can be easily determined for each particular workpiece or material, for example, by heating the workpiece to just about the transformation point and by applying an upsetting pressure until flowing sets in. In any event, this upsetting pressure will in each case be higher than the customary upsetting pressures used in welding procedures. By applying and maintaining such upsetting pressure, the workpiece will continue slowly to flow in the region of the welding area or seam as long as the mean temperature of the welding zone is higher than the temperature corresponding to the applied pressure.

The flowing can be exactly observed, for example, by means of a scale which indicates the jaw distance at the machine. As soon as the movement has terminated or has come to rest, the operator may be certain that, provided a correct pressure has been adjusted, the temperature of the workpiece is now below the transformation point. The machine current is then again switched-in in order to increase the temperature of the welding area correspondingly for the purpose again to initiate the flowing. The re-heating may be preceded by a short time interval which may be in the magnitude of several seconds. As soon as the flow movement is again recognizable, the current is again switched off, whereby the workpiece will cool down again until it has reached a temperature at which the flow movement again ceases. The procedure may be repeated any number of times, for example, so often until a predetermined total upsetting degree has been obtained.

As previously set forth, exact determination of the applied pressure is necessary since otherwise the temperature conditions would be incorrect. A pressure which is too low is particularly harmful since in such event the flowing would terminate at a temperature which is still too high and the cooling workpiece would thus remain heated above the transformation point for too long a period. This would cause a large grain structure in the welding seam which is undesired. However, a pressure which is too high is also harmful because in such event the flowing would take place in too short a period so that the desired structural transformation of the welding seam, which requires a certain period of time, would not take place or would only incompletely take place. Furthermore, a flow movement which is too rapid cannot be properly controlled and observed.

Another advantage of the inventive method is that, due to the deformation which takes place simultaneously with the flowing, a structural formation is obtained which is equivalent to that occurring in forging. The crystals of the material from which the workpiece is made become squashed and the formation of large grains is thus prevented and precluded. Moreover, the inventive method shows a simple way to obtain with butt welding a desired predetermined final dimension. This has not been possible in the prior art procedures.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIGURES 1a, 1b, and 1c of the drawing are graphs wherein, in dependence on time, FIG. 1a indicates the path or distance which is traveled by a workpiece in direction toward the workpiece with which the first mentioned workpiece is welded, FIG. 1b indicates the current strength used during the welding procedure and FIG. 1c indicates the upsetting pressure.

In viewing FIG. 1a, it will be noted that, up to the time when the upsetting pressure is applied and the current of the machine is switched off, one of the workpieces during the flash butt welding moves slowly toward the other workpiece with which it is welded. After the upsetting pressure has been applied, which is at a temperature above the transformation point so that the workpiece is still hot, the movement suddenly becomes much faster until it again slows down. When the workpiece has cooled down sufficiently, the flowing ceases so that the movement is practically zero. After a brief intermission the current is again switched on resulting in renewed heating of the workpiece. This, in turn, results in a flowing movement of one of the workpieces toward the other one until the current is again switched off and the workpiece has cooled down to a sufficient extent.

Referring now to FIG. 1b, it will be noted that the flash butt welding proceeds in the time interval between switching on and switching off of the current and until the upsetting pressure is applied. Upon termination of the flowing movement, and after a brief interval the current is again switched on.

In respect to FIG. 1c, it will be noted that the upsetting pressure is applied during predetermined time.

Experience has demonstrated that excellent results are obtained with an upsetting pressure $\geq 5$ kp./mm.$^2$ while the current strength may be $\geq 3$ ampere/mm.$^2$.

Example

Two workpieces of 200 mm$\phi$ and made of steel with 0.45% C. were flash butt welded in an electrically operated welding machine. After upsetting in the customary manner an upset pressure of 160 t. remains at the workpieces. Therefore the workpieces will continue slowly to flow in the region of the welding area whereby follows an after-upsetting of 5 mm. After termination of the flowing the machine current of 110,000 amperes is again switched-in till by further slowly flowing again 5 mm. are after-upset. Now the machine current is again switched off and after a short time the upset pressure also.

The praxis has proved that the desired effect (the "flowing" at a temperature which is slightly above the temperature of the transformation point ($A_{c3}$)) is obtained, if the upset pressure is $\geq 5$ kp./mm.$^2$.

While a specific embodiment of the invention has been shown and described in detail to illustrate the application of the inventive principles, it will be understood that the invention may be embodied otherwise without departing from such principles.

What is claimed is:

1. A method of improving the welding seam structure of workpieces which have been electrically flash butt welded, which comprises subjecting the welding seam, after welding, to an upsetting pressure of a magnitude sufficient to cause plastic deformation or flowing of the welding seam at a temperature which is at least equal to the temperature of the transformation point of the welding seam, and heating the welding seam to a temperature above said transformation point temperature, whereby the welding seam continues to flow until the welding seam has cooled down to a temperature approximating that of the transformation point.

2. A method as claimed in claim 1, wherein the welding seam, after having cooled down to at least the transformation point, is again heated to a temperature above the transformation point while maintaining said upsetting pressure.

3. A method of claim 2, wherein the heating to above the transformation point temperature is repeatedly performed while maintaining said upsetting pressure.

4. A method as claimed in claim 1, wherein the welding proper of the workpiece is performed in an electrically operated welding machine, the heating of said welding seam after the welding being performed while the workpiece is still in the machine by actuating the electrical current of the welding machine.

5. A method as claimed in claim 1, wherein the workpiece is repeatedly heated to a temperature above the transformation temperature and is allowed to cool down to at least the transformation point temperature until the structure of the welding seam has been altered in a desired manner.

6. In the electrical flash butt welding of workpieces in an electrically operated welding machine, a method of improving the structure of the welding seam, said method comprising subjecting the welding seam, after completed welding and while the workpiece is still within the machine and at a temperature above the transformation point of the seam, to an upsetting pressure of a magnitude sufficient to cause plastic deformation or flowing of the welding seam at a temperature which is about equal to the temperature of the transformation point of the welding seam, whereby the welding seam continues to flow until it has cooled down to approximately the temperature of the transformation point, and thereafter again actuating the electric current of the machine to heat the welding seam to a temperature above the transformation point while maintaining said upsetting pressure, whereby flowing of the welding seam continues until the welding seam again has cooled down to a temperature approximating that of the transformation point.

7. A method as claimed in claim 1, wherein the upsetting pressure is about $\geqq 5$ kp./mm.$^2$.

8. A method as claimed in claim 4, wherein the current strength of the electrical current is about $\geqq 3$ amperes/mm.$^2$.

References Cited

UNITED STATES PATENTS

| 2,231,317 | 2/1941 | Bernard | 219—100 |
| 2,627,009 | 1/1953 | Corson et al. | 219—104 |

FOREIGN PATENTS

| 452,707 | 8/1936 | Great Britain. |

RICHARD M. WOOD, *Primary Examiner.*

C. CHADD, *Assistant Examiner.*

U.S. Cl. X.R.

29—487; 148—11.5